United States Patent Office 3,121,747
Patented Feb. 18, 1964

3,121,747
METHOD FOR HYDROGENATING TERTIARY ACETYLENIC AMINES
Carl W. Kruse and Roger F. Kleinschmidt, Bartlesville, Okla., assignors to Phillips Petroleum Company, a corporation of Delaware
No Drawing. Filed Aug. 12, 1960, Ser. No. 49,129
9 Claims. (Cl. 260—583)

This invention relates to a process for hydrogenating tertiary acetylenic amines.

In our copending application S.N. 49,131, filed August 12, 1960, a method is disclosed for preparing certain tertiary acetylenic amines by the reaction of an alkyne higher than acetylene with a secondary amine. The amines thus prepared are novel compounds. Said application also sets forth a method for removing the catalyst from the reaction products so that hydrogenation of the acetylenic amines can be effected. This invention is concerned with the hydrogenation of these acetylenic amines and with controlling the reaction to control the type of products formed.

Said application discloses that novel tertiary amines containing internal acetylenic bonds can be prepared by a process which comprises contacting a secondary amine selected from the group consisting of

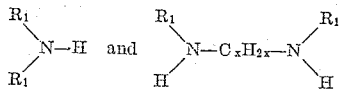

wherein each $R_1$ is selected from the group consisting of alkyl radicals containing from 1 to 6 carbon atoms and cycloalkyl radicals containing from 5 to 6 carbon atoms; wherein the 2 $R_1$'s of the monoamine can together with the nitrogen form a saturated heterocyclic ring containing from 5 to 6 ring atoms, said ring atoms other than the nitrogen being selected from the group consisting of carbon and oxygen, with at least three of said ring atoms being carbon; and wherein $x$ is an integer of from 2 to 8, with an alkyne of the formula $R_2$—C≡C—H wherein $R_2$ is selected from the group consisting of alkyl, aralkyl, alkaralkyl, cycloalkyl, alkylcycloalkyl, polycycloalkyl, alkylpolycycloalkyl radicals containing from 1 to 10 carbon atoms and —$CH_2$—O—$R_3$, wherein $R_3$ is a 1–10 carbon alkyl, in the presence of a catalyst selected from the group consisting of zinc and cadmium salts of selected organic acids, cuprous chloride and cuprous bromide. The terminology "polycycloalkyl" is intended to include monovalent radicals from saturated bicyclo or tricyclo bridged hydrocarbon ring systems.

Somes examples of amines which can be employed in the process are: dimethylamine, diethylamine, diisopropylamine, di-n-butylamine, di-n-pentylamine, di-tert-hexylamine, ethylmethylamine, piperidine, pyrrolidine, morpholine, N,N'-dimethylethylenediamine, N,N' - diethyl-propane-1,3-diamine, N,N'-di-n-propylbutane-1,4-diamine, N,N'-dicyclohexyloctane-1,8-diamine, N - methyl - N' - n-hexylpentane-1,5-diamine and the like.

Some examples of alkynes which can be employed are methylacetylene (propyne), ethylacetylene, n-propylacetylene, n-butylacetylene, n-decylacetylene, benzylacetylene, cumylacetylene, phenylethylacetylene, 3-phenylbutylacetylene, 4-methylbenzylacetylene, 3-ethylphenylethylacetylene, 4-n-propylbenzylacetylene, cyclohexylacetylene, cyclopentylacetylene, 3-methylcyclohexylacetylene, 4-n-butylcyclohexylacetylene, camphylacetylene, 2-pinylacetylene, methoxymethylacetylene, ethoxymethylacetylene and n-decoxymethylacetylene. The preferred alkynes are those of the above general formula wherein $R_2$ is an alkyl radical, and the most desirable groups are those where $R_2$ is a 1-6 carbon alkyl.

The zinc and cadmium salts of acetic, propionic, butyric, benzoic and naphthenic acids are applicable as catalysts in the process. The preferred catalyst is a mixture of zinc and cadmium acetates. These salts are employed as anhydrous salts, and are conveniently prepared by blending, for example, a 50/50 mixture of zinc acetate dihydrate and cadmium acetate dihydrate and then dehydrating the mixture at an elevated temperature.

The contacting of one of the amines with one of the alkynes in the presence of the above-defined salts is carried out at a temperature in the range of 100–200° C., preferably between 120 and 150° C. The pressure of the reaction is not critical, and depends upon the temperature, the vapor pressure of the reactants, or the alkyne charge rate if a normally gaseous alkyne, such as propyne (methylacetylene), is being employed. The reaction is usually carried out at a pressure between 50 and 500 p.s.i.g. The reaction time depends upon the temperature being employed, but is usually in the range of .1 to 48 hours.

It is desirable to supply at least two moles of alkyne per amino nitrogen present, and it is preferred to utilize an excess over and above this amount, as for example 2.5–3.0 moles of alkyne/amino nitrogen. Thus if a monoamine is employed, at least two moles of alkyne per mole of amine should be used, and if a diamine is employed, a minimum of four moles of alkyne per mole of amine should be used. The foregoing assumes that a maximum yield based upon the amine if desired; but the reactant can be supplied in any proportions to effect the reaction, such as 0.1 to 10 moles of alkyne per mole of amine.

The amount of catalyst employed is not critical, although the amount usually employed is within the range of 0.0065 to 0.05 mole per mole of amine present.

The following equation illustrates the method by which the novel tertiary amines containing an internal acetylenic linkage are formed:

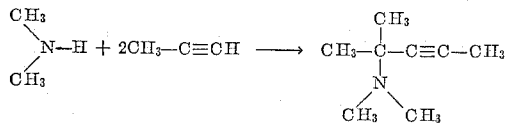

Accordingly, it is an object of the invention to provide a method or process for hydrogenation of acetylenic amines. Another object is to control the hydrogenation so that hydrogenolysis is the predominant reaction whereby hydrocarbons and secondary amines are produced. A further object is to control the hydrogenation so that the predominant reaction is reduction of the compound. Other objects of the invention will become apparent upon consideration of the accompanying disclosure.

We have discovered that the reaction of hydrogen with certain tertiary acetylenic amines can be directed toward either the production of hydrocarbons through hydrogenolysis or the production of saturated amines by reduction.

Thus, the present invention comprises the reaction of hydrogen with a compound having a formula selected from the group consisting of

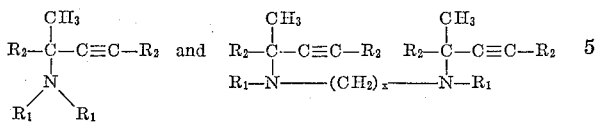

wherein each $R_1$ is selected from the group consisting of alkyl radicals containing from 1 to 6 carbon atoms and cycloalkyl radicals containing from 5 to 6 carbon atoms; wherein the two $R_1$'s on a single nitrogen atom can together with the nitrogen form a saturated heterocyclic ring containing from 5 to 6 ring atoms, said ring atoms other than nitrogen being selected from the group consisting of carbon and oxygen, with at least three of said ring atoms being carbon; wherein $x$ is an integer of from 2 to 8, wherein $R_2$ is selected from the group consisting of alkyl, aralkyl, alkylaralkyl, cycloalkyl, alkylcycloalkyl, polycycloalkyl, and alkylpolycycloalkyl radicals containing from 1 to 10 carbon atoms and —$CH_2$—O—$R_3$, wherein $R_3$ is a 1–10 carbon alkyl, in contact with a hydrogenation catalyst of the group consisting of Pt, Pd, and Ni.

The terminology polycycloalkyl is intended to include monovalent radicals from saturated bicyclo or tricyclo bridged hydrocarbon ring systems.

The reaction of hydrogen with the above-identified tertiary acetylenic amines can be carried out in the presence or absence of a diluent. The types of diluents are selected from the group consisting of neutral to basic and acidic diluents.

When the reaction is carried out by reacting hydrogen with one of the above amines in the absence of a diluent, or in the presence of a neutral to basic diluent, hydrogenolysis is the predominant reaction. On the other hand, reduction is the predominant reaction when acidic diluents are employed.

The neutral to basic diluents which can be employed are alkanes, cycloalkanes, and alkyl-substituted cycloalkanes containing from 2 to 10 carbon atoms, ethers of the formula R—O—R wherein each R is selected from the group consisting of alkyl and cycloalkyl radicals containing from 1 to 6 carbon atoms, alcohols of the formula $R_1OH$ wherein $R_1$ is an alkyl, cycloalkyl, alkylcycloalkyl or cycloalkylalkyl radical containing from 1 to 8 carbon atoms and amines selected from the group consisting of piperidine, morpholine and amines of the formulas $(R_2)_3N$ and $(R_2)_2NH$ wherein each $R_2$ is an alkyl or cycloalkyl radical containing from 1 to 6 carbon atoms. The amines, of course, are basic or alkaline.

Some examples of suitable neutral to basic diluents are ethane, n-butane, isooctane, n-decane, cyclohexane, methylcyclohexane, n-butylcyclohexane, 2-cyclohexylbutane, decalin, dimethyl ether, di-n-butyl ether, di-n-hexyl ether, dicyclohexyl ether, methanol, ethanol, octanol, cyclohexanol, cyclooctanol, ethylcyclohexanol, cyclohexylethanol, trimethylamine, diethylamine, cyclohexylamine, tri-n-butylamine, di-n-propylamine, and tri-n-hexylamine.

The acidic diluents which can be employed are selected from the group consisting of organic acids of the formula $R_3COOH$ wherein $R_3$ is an alkyl radical of from 1 to 6 carbon atoms. These acidic diluents are employed as essentially anhydrous diluents, although a minimum amount of water, e.g., 0.5 to 1.0% by weight can be tolerated. Some examples of organic acids which can be employed are acetic acid, propionic acid, butyric acid, and heptanoic (enanthic) acid.

The weight ratio of diluent, when used, to acetylenic amine is generally within the range of 0.5:1 to 20:1, preferably 1:1 to 5:1. Amounts between zero diluent and the 0.5:1 ratio can be used, however.

When one operates, according to this invention, with a neutral diluent such as ethanol, hydrogenolysis is the predominant reaction and hydrocarbons are the predominant product, since the amine group is split off. For example, when a compound of the formula

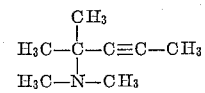

(N,N,1,1-tetramethyl-2-butynylamine or 2-dimethylamino-2-methyl-3-pentyne)

is reacted with hydrogen according to this invention in the presence of ethanol, the predominant products are 4-methyl-2-pentene and 2-methylpentane. Of course, since hydrogenolysis is taking place, dimethylamine is also a major product. On the other hand, if the reaction is carried out in the presence of an acidic diluent such as acetic acid, for example, the predominant product is N,N,1,1-tetramethylbutylamine. It is recognized that some hydrogenolysis occurs in the presence of an acid solvent and some hydrogenation occurs in the presence of a neutral or basic solvent or in the absence of a solvent.

The hydrogenation catalysts which can be employed in the reaction of hydrogen with these tertiary acetylenic amines are platinum, palladium, and nickel, including the unsupported catalysts and the supported varieties which are supported on such materials as kieselguhr, charcoal, calcium carbonate, and the like. One must choose a hydrogenation catalyst which will not be poisoned or deactivated in any way by the reaction solution which is to be used.

The reaction of hydrogen with the tertiary acetylenic amines of the above formula is carried out at a temperature in the range of 0 to 200° C. and at a pressure in the range of atmospheric to 1000 p.s.i. Reaction times will generally be in the range of 1 minute to several days. It will be shown by the examples that the choice of solvent determines whether hydrogenation or hydrogenolysis is the predominant reaction.

Some examples of compounds of the above general formula which can be reacted with hydrogen according to the method of this invention are: 2-dimethylamino-2-methyl-3-pentyne, 3-diethylamino-3-methyl-4-heptyne, 7-di-n-hexylamino-7-methyl-8-pentadecyne, 2-di-n-butylamino-2-methyl-3-pentyne, 2-dicyclohexylamino-2-methyl-3-pentyne, 4-dicyclopentylamino-4-methyl-5-nonyne, 3-(1-piperidyl)-3-methyl-4-heptyne, 2-(4-morpholyl)-2-methyl-3 - pentyne, N,N' - dimethyl - N,N' - di - (2 - [2 - methyl-3-pentynyl])-ethylenediamine, N,N'-di-n-hexyl-N,N'-di(5-[5-methyl-6-undecynyl])-octane-1,8-diamine, and 5-diethylamino-5-methyl-3,9-dioxaundecyne-6.

After reacting the amines with hydrogen according to the method of this invention, the products can be recovered by such methods as fractionation and other methods conventional in the art. It is recognized that when fractionation is to be employed for the recovery of products one should select a specific diluent within the desired family of diluents which will not boil too close to the anticipated products.

The following specific examples are intended to illustrate the advantages of this invention, but it is not intended that the invention be limited to the specific embodiments shown therein.

*Example I*

A run was carried out in which N,N,1,1-tetramethyl-2-butynylamine was reacted with hydrogen in a neutral diluent according to the process of this invention. (This amine can also be named 2-dimethylamino-2-methyl-3-pentyne.)

In this run, 100 grams of crude N,N,1,1-tetramethyl-2-butynylamine was diluted with 75 ml. of ethanol and hydrogenated under 3 atmospheres' hydrogen pressure at room temperature (approximately 25° C.) over a platinum catalyst. Approximately 1.2 moles of hydrogen was absorbed in 24 hours. After removal of the catalyst by filtration, the filtrate was distilled in a Vigreux column. Upon removal of the lower boiling components, including the alcohol solvent, 63.4 grams of organic material remained. This 63.4 grams of residue was then distilled, and 57.5 grams of material distilled over at conditions varying from 130° C. at atmospheric pressure to 87° C. at 0.4 mm. Hg absolute pressure. None of the overhead product had a refractive index indicative of N,N,1,1-tetramethylbutylamine (see Example II). Refractionation of 52.2 grams of this material gave a 15.2 gram cut having a plateau boiling point 45°–46° C. at 20–22 mm. Hg absolute pressure, $n_D^{20}=1.4315$. Mass and infrared spectrograms of this material established that the material was a mixture of N,N,1,1-tetramethyl-2-butenylamine, molecular weight 127, and N,N,1,1-tetramethylbutylamine, molecular weight 129. The mass spectrum had peaks at 127 and 129 mass units, and the infrared spectrum possessed a band characteristic of a double bond at 6.05 microns. The predominant component had a mass of 127.

The lower boiling cuts, boiling point 48–83° C. at 746 mm. mercury absolute pressure were diluted with 250 ml. water, and hydrochloric acid was added until the solution was acidic. About 2.7 grams of a colorless oil separated. This oil was removed and dried over calcium sulfate. By gas chromatography it was shown that four hydrocarbons with retention times in the $C_6$ range were present. One of the $C_6$ peaks corresponded to 2-methylpentane, and two of the remaining peaks corresponded to 2-methyl-1-pentene or 2-methyl-2-pentene and cis-4-methyl-2-pentene. Infrared spectroanalysis of the same sample established 2-methyl-2-pentene and trans-4-methyl-2-pentene.

*Example II*

In another run, a sample of the tertiary acetylenic amine of Example I was reacted with hydrogen in an acidic diluent.

In this run, a 25 gram (0.2 mole) sample of pure N,N,1,1-tetramethyl-2-butynylamine, boiling point 65.5° C. at 58 mm. mercury absolute pressure and $n_D^{20}=1.4443$, was hydrogenated at room temperature over platinum catalyst in approximately 100 ml. of glacial acetic acid. The hydrogen absorbed at approximately 3 atmospheres' pressure over a 2 hour period amounted to 0.4 mole. The acetic acid solution was poured into 150 ml. of ammonium hydroxide and ice, and the oil which separated was extracted with ether. The ethereal solution was then dried over calcium sulfate, following which the material was distilled. The yield of product containing a major amount of N,N,1,1-tetramethylbutylamine, boiling range 134–138° C. at 758 mm. mercury absolute pressure and $n_D^{20}$ of 1.4210–1.4232 was 12.8 grams. The mass spectrogram of a cut which boiled at 138° C. at 758 mm. mercury absolute pressure and $n_D^{20}=1.4228$ indicated that the principal component had a mass of 129 and was N,N,1,1-tetramethylbutylamine.

*Example III*

In another run, a 0.2982 gram sample (1.94 mmoles) of pure N,N-diethyl-1,1-dimethyl-2-butynylamine in ethanol absorbed 5.2 mmoles of hydrogen in 84 minutes at room temperature (approximately 25° C.) and atmospheric pressure over platinum catalyst. The properties of the pure sample of amine were: boiling point 60° C. at 9 mm. mercury absolute pressure, $n_D^{20}=1.4470$. Another sample of the same amine, 0.2417 gram (1.58 mmoles) was added to the mixture, and an additional 5 mmoles of hydrogen was absorbed in two hours. The molar ratio of hydrogen to amine was 2.9:1. The ethanol solution of the hydrogen reaction products was then heated, and a few milligrams of oxalic acid was dissolved in the first two ml. of distillate. Upon addition of 5 ml. of diethyl ether, the oxalate derivative of diethylamine, melting point 209–210° C. (with decomposition), precipitated. A mixed melting point of this derivative with an authentic sample was not depressed. The formation of this derivative is evidence of the hydrogenolysis of the tertiary acetylenic amine.

In another run, an 0.6171 gram sample (4.02 mmoles) of pure N,N-diethyl-1,1-dimethyl-2-butynylamine in methylcyclohexane absorbed 11.1 mmoles of hydrogen in 9 hours over a platinum catalyst. The total solution weight after hydrogenation was 15.1 grams and contained 1.3 weight percent 2-methylpentane which corresponded to 56.5% theoretical yield. There was also 0.3 weight percent of an unidentified hydrocarbon.

Comparison of Examples I and II show that hydrogenation in the presence of acetic acid gave approximately 50% yield of pure saturated amine, whereas hydrogenation in ethanol gave approximately 15% yield of a mixture of saturated and unsaturated amines.

Certain modifications of the invention will become apparent to those skilled in the art and the illustrative details disclosed are not to be construed as imposing unnecessary limitations on the invention.

We claim:

1. A process comprising reacting hydrogen with a tertiary acetylenic amine having a formula selected from the group consisting of

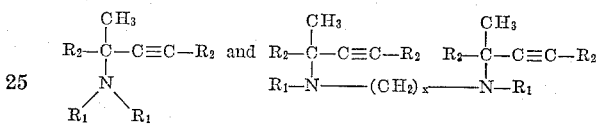

wherein each $R_1$ is selected from the group consisting of alkyl radicals containing from 1 to 6 carbon atoms and cycloalkyl radicals containing from 5 to 6 carbon atoms; wherein the two $R_1$'s on a single nitrogen atom can together with the nitrogen form a saturated heterocyclic ring containing from 5 to 6 ring atoms, said ring atoms other than nitrogen being selected from the group consisting of carbon and oxygen, with at least three of said ring atoms being carbon; wherein $x$ is an integer of from 2 to 8, wherein $R_2$ is selected from the group consisting of alkyl, aralkyl, alkylaralkyl, cycloalkyl, and alkylcycloalkyl radicals containing from 1 to 10 carbon atoms and —$CH_2$—O—$R_3$, wherein $R_3$ is a 1–10 carbon alkyl, in contact with a hydrogenation catalyst of the group consisting of Pt, Pd, and Ni at a temperature in the range of 0 to 200° C., at a pressure in the range of atmospheric to 1000 p.s.i.g., and in a neutral to basic medium so as to effect principally hydrogenolysis of said amine.

2. The process of claim 1 wherein said amine is admixed with a neutral to basic diluent in a ratio of diluent to amine in the range of 0.5:1 to 20:1.

3. The process of claim 2 wherein said diluent consists essentially of ethanol.

4. The process of claim 1 wherein said amine is N,N,1,1-tetramethyl-2-butynylamine and the reaction products include 4-methyl-2-pentene, 2-methylpentane, and dimethylamine.

5. The process of claim 1 wherein said amine is N,N-diethyl-1,1-dimethyl-2-butynylamine and the reaction product consists principally of hydrocarbons and diethylamine.

6. The process of claim 4 wherein said catalyst consists essentially of Pt and said diluent consists essentially of ethanol in a weight ratio to said compound in the range of 0.5:1 to 20:1.

7. A process comprising reacting hydrogen with a tertiary acetylenic amine having a formula selected from the group consisting of

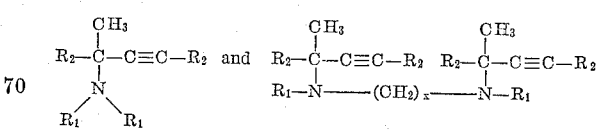

wherein each $R_1$ is selected from the group consisting of alkyl radicals containing from 1 to 6 carbon atoms and cycloalkyl radicals containing from 5 to 6 carbon atoms; wherein the two $R_1$'s on a single nitrogen atom can together with the nitrogen form a saturated heterocyclic ring containing from 5 to 6 ring atoms, said ring atoms other than nitrogen being selected from the group consisting of carbon and oxygen, with at least three of said ring atoms being carbon; wherein $x$ is an integer of from 2 to 8, wherein $R_2$ is selected from the group consisting of alkyl, aralkyl, alkylaralkyl, cycloalkyl, and alkylcycloalkyl radicals containing from 1 to 10 carbon atoms and —$CH_2$—O—$R_3$, wherein $R_3$ is a 1–10 carbon alkyl, in contact with a hydrogenation catalyst of the group consisting of Pt, Pd, and Ni at a temperature in the range of 0 to 200° C., at a pressure in a range of atmospheric to 1000 p.s.i.g., and in an acid medium to effect hydrogenation of said amine.

8. The process of claim 5 wherein said catalyst consists essentially of Pt and said diluent consists essentially of ethanol in a weight ratio to said compound in the range of 0.5:1 to 20:1.

9. The process of claim 5 wherein said catalyst consists essentially of Pt and said diluent consists essentially of methylcyclohexane.

References Cited in the file of this patent

UNITED STATES PATENTS 2,110,199     Carothers _____ Mar. 8, 1938